US010404563B2

(12) United States Patent
Hotta et al.

(10) Patent No.: US 10,404,563 B2
(45) Date of Patent: Sep. 3, 2019

(54) METHOD FOR ANALYSIS, ANALYZER, AND NON-TRANSITORY COMPUTER-READABLE RECORDING MEDIUM HAVING STORED THEREIN ANALYSIS PROGRAM

(71) Applicant: FUJITSU LIMITED, Kawasaki-shi, Kanagawa (JP)

(72) Inventors: Yuuji Hotta, Kawasaki (JP); Takeshi Yasuie, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 137 days.

(21) Appl. No.: 15/401,307

(22) Filed: Jan. 9, 2017

(65) Prior Publication Data

US 2017/0214594 A1 Jul. 27, 2017

(30) Foreign Application Priority Data

Jan. 21, 2016 (JP) ................................ 2016-009937

(51) Int. Cl.
*H04L 12/26* (2006.01)
*G06F 17/50* (2006.01)

(52) U.S. Cl.
CPC ...... *H04L 43/0852* (2013.01); *G06F 17/5009* (2013.01); *G06F 17/5031* (2013.01); *G06F 2217/84* (2013.01)

(58) Field of Classification Search
CPC . H04L 41/06; H04L 41/0654; H04L 41/0668; H04L 41/0677; H04L 41/12;
(Continued)

(56) References Cited

U.S. PATENT DOCUMENTS 5,754,442 A 5/1998 Minagawa
6,785,723 B1 * 8/2004 Genty .............. G06F 17/30899 707/E17.119

(Continued)

FOREIGN PATENT DOCUMENTS

JP 08-147344 6/1996
JP 2000-83057 3/2000

OTHER PUBLICATIONS

Zhang et al., Service failure diagnosis in service function chain, Nov. 2, 2017, 2017 19th Asia-Pacific Network Operations and Management Symposium (APNOMS) (Year: 2017).*

(Continued)

*Primary Examiner* — Eric Nowlin
(74) *Attorney, Agent, or Firm* — Fujitsu Patent Center

(57) ABSTRACT

The analyzer includes a path information obtainer that extracts a component that a first function among a plurality of functions sometimes uses and sometimes does not use as an undetermined component beforehand; a detector that detects whether the undetermined component is used during operation; and a specifier that specifies, when a problem arises during the operation, a problem component, as a problem point, among one or more components based on path information including the one or more components that each of the plurality of functions uses and being obtained for the function beforehand, operation information obtained during the operation, and a result of detecting using of the undetermined component. This configuration makes it possible to specify an exact problem point.

17 Claims, 17 Drawing Sheets

(58) Field of Classification Search
CPC ..... H04L 43/0852; H04L 45/00; H04L 45/02; H04L 45/12; H04L 45/22; H04L 45/28; H04L 69/40
See application file for complete search history.

(56) References Cited

U.S. PATENT DOCUMENTS

| | | | | |
|---|---|---|---|---|
| 7,373,415 | B1 * | 5/2008 | DeShan | H04L 43/50 709/231 |
| 7,852,752 | B2 * | 12/2010 | Kano | H04J 14/0227 14/227 |
| 8,072,879 | B2 * | 12/2011 | Vasseur | H04J 3/14 370/225 |
| 8,089,865 | B2 * | 1/2012 | Mizutani | H04L 12/1863 370/223 |
| 8,134,920 | B2 * | 3/2012 | Imajuku | H04J 14/0284 370/228 |
| 8,199,649 | B2 * | 6/2012 | McAllister | H04L 41/0668 370/235 |
| 8,422,364 | B2 * | 4/2013 | Wijnands | H04L 45/507 370/228 |
| 8,462,617 | B2 * | 6/2013 | Tsukishima | H04L 41/0663 370/216 |
| 8,488,444 | B2 * | 7/2013 | Filsfils | H04L 45/02 370/217 |
| 8,489,676 | B1 * | 7/2013 | Chaplin | G06F 17/3089 709/201 |
| 9,135,257 | B2 * | 9/2015 | Chaplin | G06F 17/3089 |
| 9,197,495 | B1 * | 11/2015 | Rauser | H04L 41/0677 |
| 9,444,675 | B2 * | 9/2016 | Guichard | H04L 41/5038 |
| 9,565,163 | B1 * | 2/2017 | Arvind | H04L 63/0245 |
| 9,571,216 | B2 * | 2/2017 | Le Pallec | H04J 3/14 |
| 9,645,899 | B1 * | 5/2017 | Felstaine | G06F 11/2002 |
| 9,686,182 | B2 * | 6/2017 | Nakash | H04L 45/28 |
| 9,722,917 | B2 * | 8/2017 | Giorgetti | H04L 45/64 |
| 9,806,962 | B2 * | 10/2017 | Guichard | H04L 41/5038 |
| 10,153,951 | B2 * | 12/2018 | Guichard | H04L 41/5038 |
| 2004/0202112 | A1 * | 10/2004 | McAllister | H04L 41/0668 370/252 |
| 2005/0111350 | A1 * | 5/2005 | Kano | H04J 14/0227 14/227 |
| 2006/0146696 | A1 * | 7/2006 | Li et al. | H04L 41/06 370/218 |
| 2006/0256712 | A1 * | 11/2006 | Imajuku | H04J 14/0284 370/218 |
| 2007/0183317 | A1 * | 8/2007 | Vasseur | H04J 3/14 370/225 |
| 2009/0010153 | A1 * | 1/2009 | Filsfils | H04L 45/02 370/218 |
| 2010/0278040 | A1 * | 11/2010 | He | H04L 12/42 370/222 |
| 2011/0126041 | A1 * | 5/2011 | Matsubara | H04L 45/22 714/4.11 |
| 2011/0280123 | A1 * | 11/2011 | Wijnands | H04L 45/507 370/228 |
| 2014/0029416 | A1 * | 1/2014 | Ceccarellli | H04L 45/22 370/225 |
| 2014/0064062 | A1 * | 3/2014 | Taillon | H04L 45/22 370/225 |
| 2014/0362682 | A1 * | 12/2014 | Guichard | H04L 41/5038 370/221 |
| 2015/0026507 | A1 * | 1/2015 | Matsubara | H04L 45/22 714/4.2 |
| 2015/0249514 | A1 * | 9/2015 | Le Pallec | H04J 3/14 370/216 |
| 2016/0337168 | A1 * | 11/2016 | Rebella | H04L 45/22 |
| 2017/0111209 | A1 * | 4/2017 | Ward | H04L 41/0631 |

OTHER PUBLICATIONS

Lee et al., Overload and failure management in service function chaining, Jul. 7, 2017, 2017 IEEE Conference on Network Softwarization (Year: 2017).*

Oi et al., Method for Estimating Locations of Service Problem Causes in Service Function Chaining, Dec. 10, 2015, 2015 IEEE Global Communications Conference (GLOBECOM) (Year: 2015).*

* cited by examiner

FIG. 6

FIRST EXAMPLE OF PROCESS OF SPECIFYING DELAY CAUSING POINT DURING ACTUAL OPERATION

| | NORMAL/DELAY | c1 | c2 | c3 | c4 | c5 | |
|---|---|---|---|---|---|---|---|
| URL1 | DELAY | 1 | 1 | 1 | 1 | 1 | ←RESULT OF INTEGRATING (a1) AND (a2) OF URL1 OF FIG. 5 |
| URL2 | NORMAL | 1 | 1 | 1 | | | ←(b1) OF URL2 OF FIG. 5 |
| DELAY CAUSE | | | | | 1 | 1 | |

IF DELAY REQUEST IS (a1) OF URL1, DELAY CAUSING POINT IS c4. HOWEVER, SINCE USED COMPONENT IS UNKNOWN, DELAY CAUSING POINT IS NOT SPECIFIED

IF DELAY REQUEST IS (a2) OF URL1, DELAY CAUSING POINT IS c5. HOWEVER, SINCE USED COMPONENT IS UNKNOWN, DELAY CAUSING POINT IS NOT SPECIFIED

SINCE PATH INFORMATION (a1) AND PATH INFORMATION (a2) ARE INTEGRATED, DELAY CAUSING POINT IS NOT NARROWED INTO COMPONENT c4 OR c5.

FIG. 8

SECOND EXAMPLE OF PROCESS OF SPECIFYING DELAY CAUSING POINT DURING ACTUAL OPERATION

| | NORMAL/DELAY | c1 | c2 | c3 | c4 | c5 | |
|---|---|---|---|---|---|---|---|
| URL1 | NORMAL | 1 | 1 | 1 | 1 | 1 | ←RESULT OF INTEGRATING (a1) AND (a2) OF URL1 OF FIG. 7 |
| URL3 | DELAY | | 1 | 1 | | 1 | ←(b2) OF URL3 OF FIG. 7 |
| DELAY CAUSE | | | | | | | |

IF NORMAL REQUEST IS (a1) OF URL1,
c5 IS SPECIFIED AS DELAY CAUSING POINT.
HOWEVER, ANALYSIS USING THE RESULT OF INTEGRATING (a1) AND (a2) MISSES IN FINDING DELAY CAUSING POINT

FIG. 9A

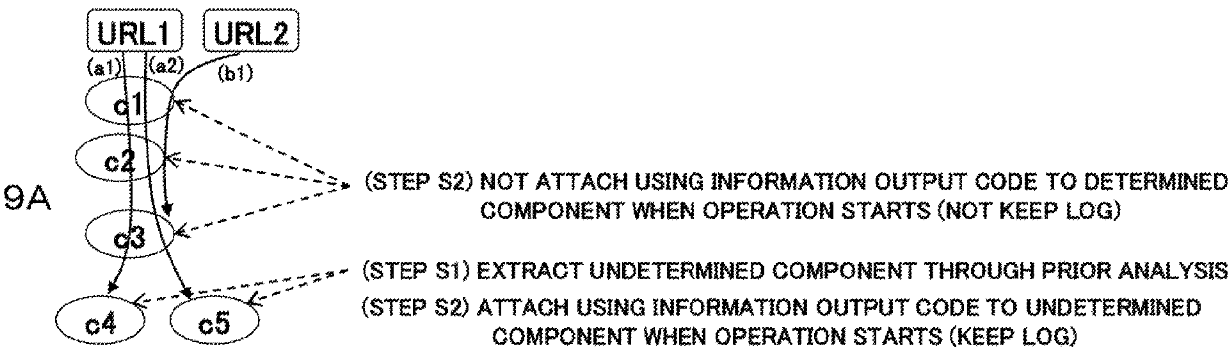

FIG. 9B

PATH INFORMATION GENERATED FROM DECISIVE INFORMATION BEFOREHAND 1=DETERMINED, 2=UNDETERMINED

| | c1 | c2 | c3 | c4 | c5 |
|---|---|---|---|---|---|
| URL1 | 1 | 1 | 1 | 2 | 2 |
| URL2 | 1 | 1 | 1 | | |

ADD COMPONENT INFORMATION OF c4 OF URL1 BASED ON INFORMATION OUTPUT DURING OPERATION

ADD COMPONENT INFORMATION OF c5 OF URL1 BASED ON INFORMATION OUTPUT DURING OPERATION

FIG. 9C (STEP S3) PROCESS OF SPECIFYING DELAY CAUSING POINT DURING OPERATION

| | NORMAL/DELAY | c1 | c2 | c3 | c4 | c5 |
|---|---|---|---|---|---|---|
| URL1 | DELAY | 1 | 1 | 1 | 1 | |
| URL2 | NORMAL | 1 | 1 | 1 | | |
| DELAY CAUSE | | | | | 1 | |

| | NORMAL/DELAY | c1 | c2 | c3 | c4 | c5 |
|---|---|---|---|---|---|---|
| URL1 | DELAY | 1 | 1 | 1 | | 1 |
| URL2 | NORMAL | 1 | 1 | 1 | | |
| DELAY CAUSE | | | | | | 1 |

PART DETERMINED BEFOREHAND

PART ADDED ON THE BASIS OF INFORMATION DURING OPERATION

FIG. 10A
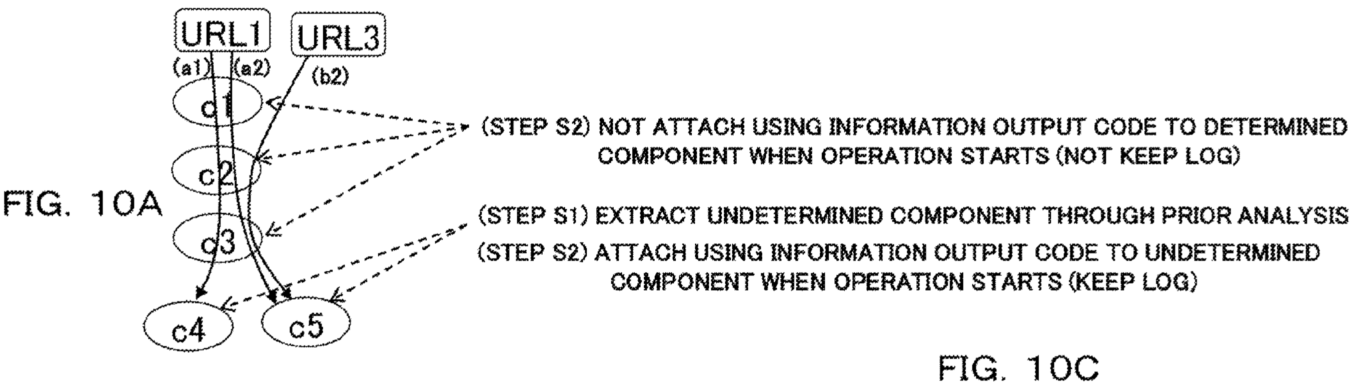
FIG. 10B
PATH INFORMATION GENERATED FROM DECISIVE INFORMATION BEFOREHAND 1=DETERMINED, 2=UNDETERMINED
| | c1 | c2 | c3 | c4 | c5 |
|---|---|---|---|---|---|
| URL1 | 1 | 1 | 1 | 2 | 2 |
| URL3 | | 1 | 1 | | 1 |
FIG. 10C
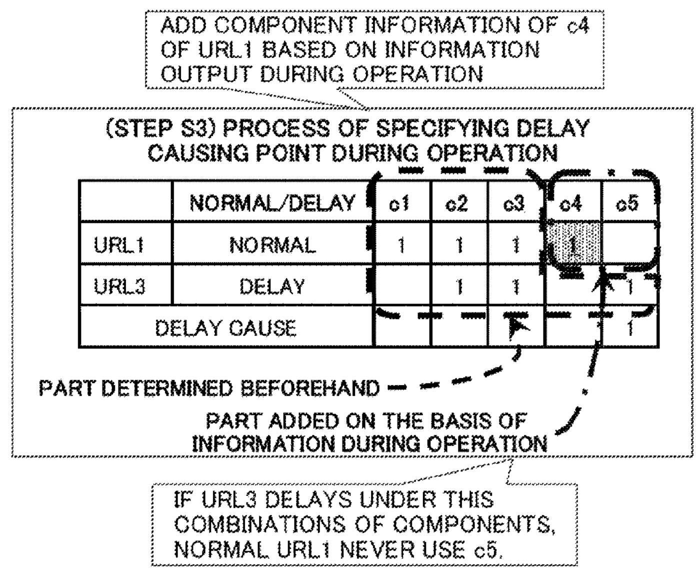
| | NORMAL/DELAY | c1 | c2 | c3 | c4 | c5 |
|---|---|---|---|---|---|---|
| URL1 | NORMAL | 1 | 1 | 1 | 1 | |
| URL3 | DELAY | | 1 | 1 | | 1 |
| DELAY CAUSE | | | | | | 1 |

FIG. 11

INFORMATION USED IN GENERATING PATHS FOR EACH REQUEST
(TRADITIONAL METHOD)
URL1 timestamp1 c1:c2:c3:c4
URL2 timestamp2 c1:c2:c3
URL1 timestamp3 c1:c2:c3:c5
URL3 timestamp4 c2:c3:c5
URL4 timestamp5 c2:c4
URL4 timestamp6 c2:c3

PATH INFORMATION

| | c1 | c2 | c3 | c4 | c5 |
|---|---|---|---|---|---|
| URL1 | 1 | 1 | 1 | 2 | 2 |
| URL2 | 1 | 1 | 1 | | |
| URL3 | | 1 | 1 | | 1 |
| URL4 | | 1 | 2 | 2 | |

(S11) INTEGRATE PATHS INFORMATION SINGLE PATH FOR EACH REQUEST URL; RECORD "1" REPRESENTING DETERMINED COMPONENT FOR COMPONENT ALWAYS USED, AND RECORD "2" REPRESENTING UNDETERMINED COMPONENT FOR COMPONENT SOMETIMES USED BUT SOMETIMES NOT USED

| | c1 | c2 | c3 | c4 | c5 |
|---|---|---|---|---|---|
| SAMPLING POINT | | | 1 | 1 | 1 |

OPERATION LOG SAMPLING POINT INFORMATION (S12) RECORD "1" FOR COMPONENT RECORDED TO BE UNDETERMINED (=2) (i.e., COMPONENT SET TO BE "2" IN POINT OF COLUM OF PATH INFORMATION) IN OPERATION LOG SAMPLING POINT INFORMATION.

PATH INFORMATION

| | c1 | c2 | c3 | c4 | c5 |
|---|---|---|---|---|---|
| URL1 | 1 | 1 | 1 | 2 | 2 |
| URL2 | 1 | 1 | 1 | | |
| URL3 | | 1 | 1 | | 1 |
| URL4 | | 1 | 2 | 2 | |

| | NORMAL/DELAY | c1 | c2 | c3 | c4 | c5 |
|---|---|---|---|---|---|---|
| URL1 | DELAY | 1 | 1 | 1 | 1 | |
| URL2 | NORMAL | 1 | 1 | 1 | | |
| URL3 | – | | | | | |
| URL4 | – | | | | | |
| DELAY CAUSE | | | | | 1 | |

DATA WHEN PROCESS OF SPECIFYING DELAY CAUSING POINT IS CARRIED OUT

METHOD FOR ANALYSIS, ANALYZER, AND NON-TRANSITORY COMPUTER-READABLE RECORDING MEDIUM HAVING STORED THEREIN ANALYSIS PROGRAM

CROSS-REFERENCE TO RELATED APPLICATION

This application is based upon and claims the benefit of priority of the prior Japanese Application No. 2016-9937 filed on Jan. 21, 2016 in Japan, the entire contents of which are hereby incorporated by reference.

FIELD

The embodiment discussed herein is related to a method for analysis, an analyzer, and a non-transitory computer-readable recording medium having stored therein an analysis program.

BACKGROUND

Application programs, network services, and others have made an attempt at specifying a delay point and an abnormal point under a state of the actual operation.

In general, for specifying a delay point or an abnormal point of a system, continuous monitoring for the state of the system is needed, sampling logs before and after of each point. For a processing sequence has processes of start-A-B-C-D-end, logs with time stamps are obtained at points of immediately before A, between A and B, between B and C, between C and D, and immediately after D. This makes it possible to specify which process among processes A-D delays. Assuming that process B delays, the process B can be specified to be the delay point by referring to the log immediately before B (i.e., the log between A and B) and the long immediately after process B (i.e., the log between B and C).

[Patent Literature 1] Japanese Laid-open Patent Publication No. HEI 8-147344

[Patent Literature 2] Japanese Laid-open Patent Publication No. 2000-83057

Here, specifying a delay point or an abnormal point of a system in, for example, an application program or a network service, needs sampling of a large number of log at many monitoring points. For the above, narrowing and specifying a delay point or an abnormal point accompanies large overhead and heavy network load.

In order to specify a problem point (delay point or abnormal point) without undesired overhead and network load, an attempt has been made at obtaining path information (operation flow) of each function (process) through obtaining and analyzing detailed logs in advance. During the actual operation, this attempt obtains the operation information (request log) of the actual operation. In the event of occurrence of a problem, the problem point is analyzed and specified by using the path information obtained beforehand and the operation information obtained during the actual operation. Hereinafter, a problem point may also be referred to as a delay causing point or a problem component.

Here, the path information includes, for example, information (component group) to specify the components used by each function. The path information of each Web function is classified according to a Uniform Resource Identifier (URI) containing a Uniform Resource Locator (URL).

For example, providing that network components c1-c5 are given as denoted in FIG. 2, message data flowing through each of the components c1-c5 is analyzed. The analysis classifies components used by each function Fi (where i is a natural number) as following formulae through the use of the URL+CGI (Common Gateway Interface) parameter for each function Fi.

Path of function F1
(http://foo.com/appli1.cgi?flag=exec)=c1-c2-c4-c5
Path of function F2
(http://foo.com/appli1.cgi?flag=calc)=c1-c3-c5
Path of function F3
(http://foo.com/appli1.cgi?data=true)=c1-c2
Path of function F4
(http://foo.com/appli2.cgi?feature=3)=c3-c4

However, even if the function (i.e., URL+CGI parameter) is the same, pieces of path information corresponding to the same function may be different in components contained therein, depending on various circumferences of the operation time zone, the day of the week, a request pattern, and/or the state of the database. In other words, in some circumference, the same function may have different path information and may consequently flow multiple different paths. In this case, the different pieces of path information of the same function are integrated into a single piece of path information of the same function and the integrated path information is defined so as to contain all the components that the same function flows through. Accordingly, the path information may contain an undetermined (indecisive) part. If the path information contains an undetermined part, an analysis is conducted during the actual operation, not grasping which request uses which components, so that an exact delay causing point is not specified (estimated).

SUMMARY

There is provided a method of analysis including: extracting a component that a first function among a plurality of functions sometimes uses and sometimes does not use as an undetermined component beforehand; detecting whether the undetermined component is used during operation; and specifying, when a problem arises during the operation, a problem component, as a problem point, among one or more components based on path information including the one or more components that each of the plurality of functions uses and being obtained for the function beforehand, operation information obtained during the operation, and a result of detecting using of the undetermined component.

The object and advantages of the invention will be realized and attained by means of the elements and combinations particularly pointed out in the claims.

It is to be understood that both the foregoing general description and the following detailed description are exemplary and explanatory and are not restrictive of the invention.

Figure 5:
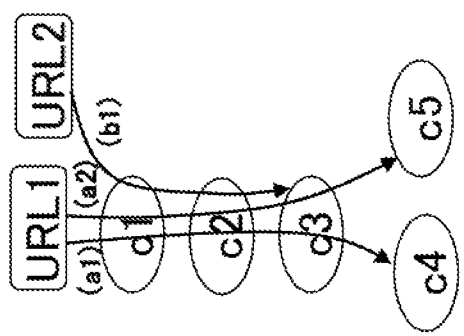
Figure 7:
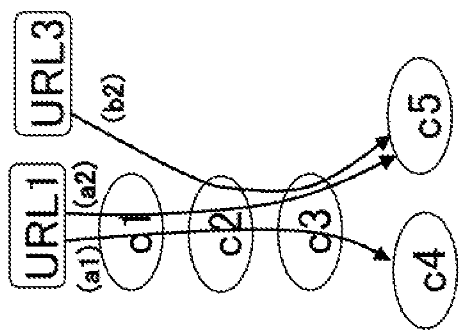
Figure 12:
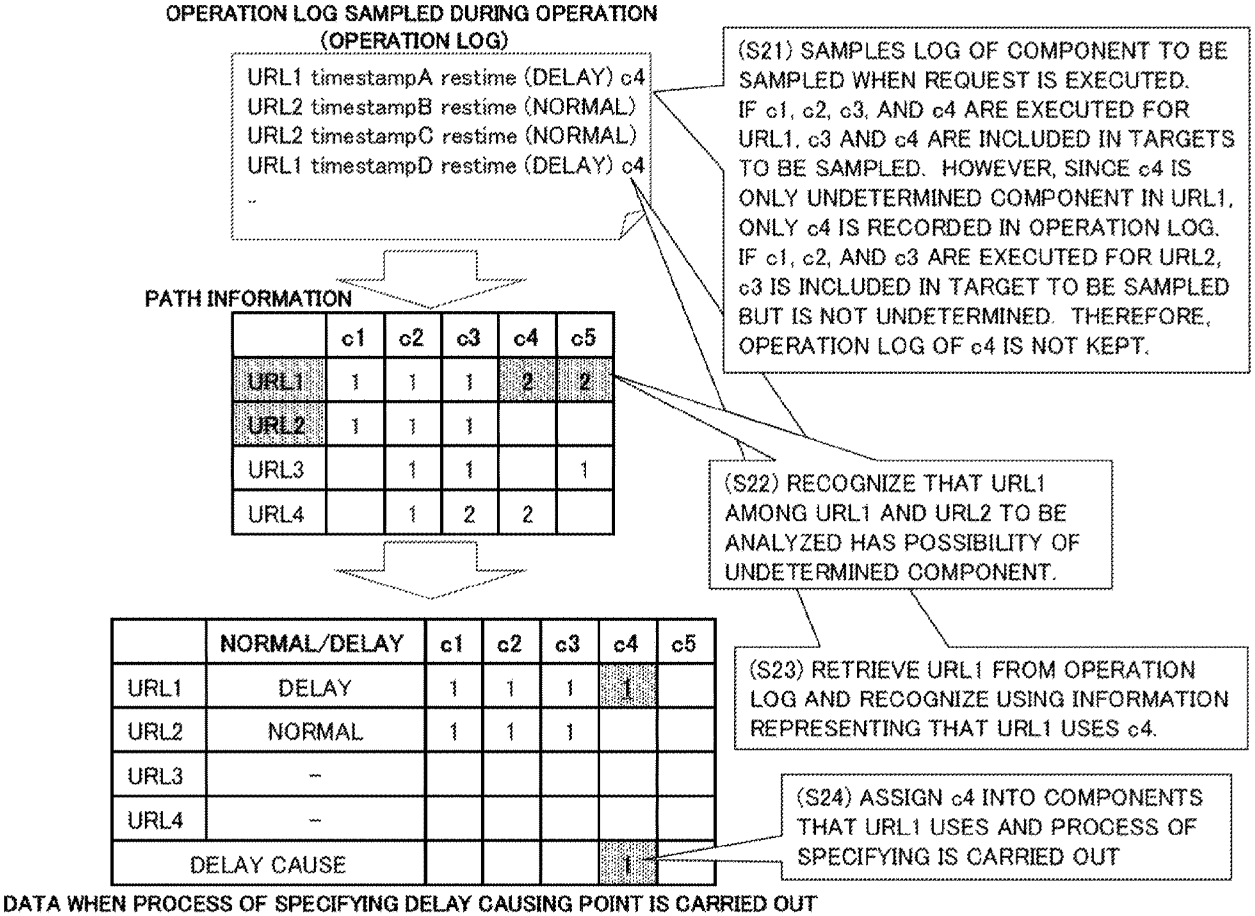
Figure 13:
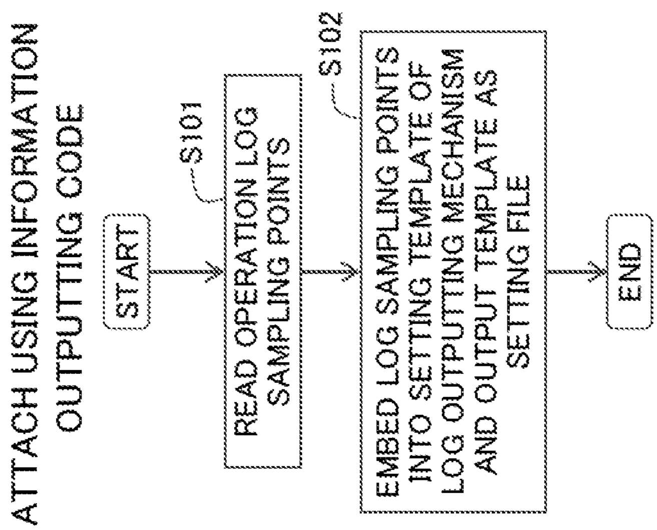
Figure 14:
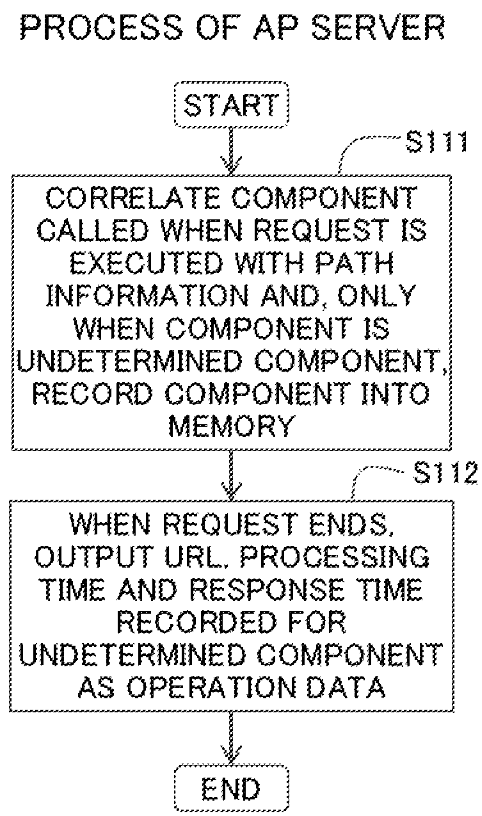
Figure 15:
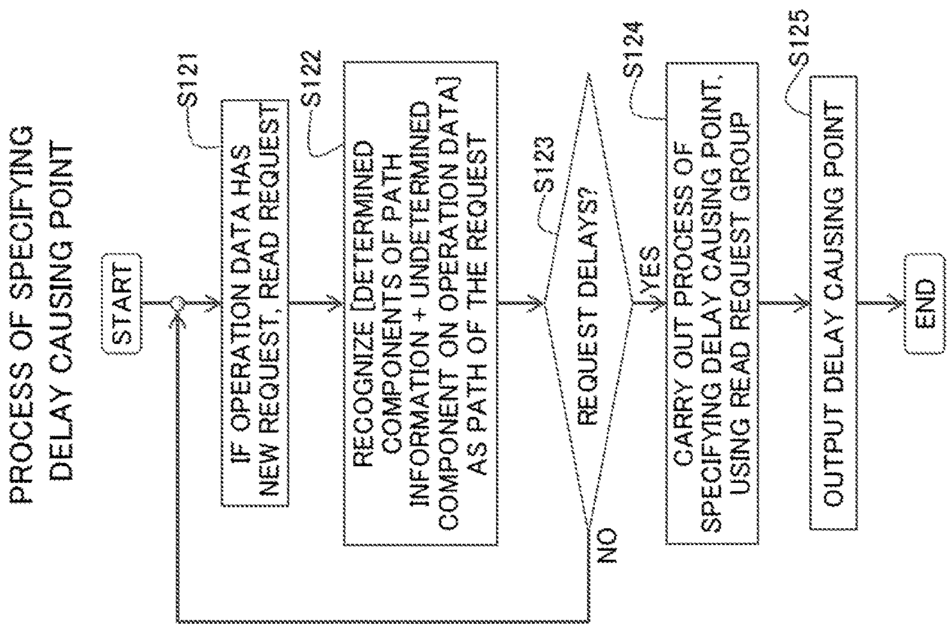
Figure 16A:
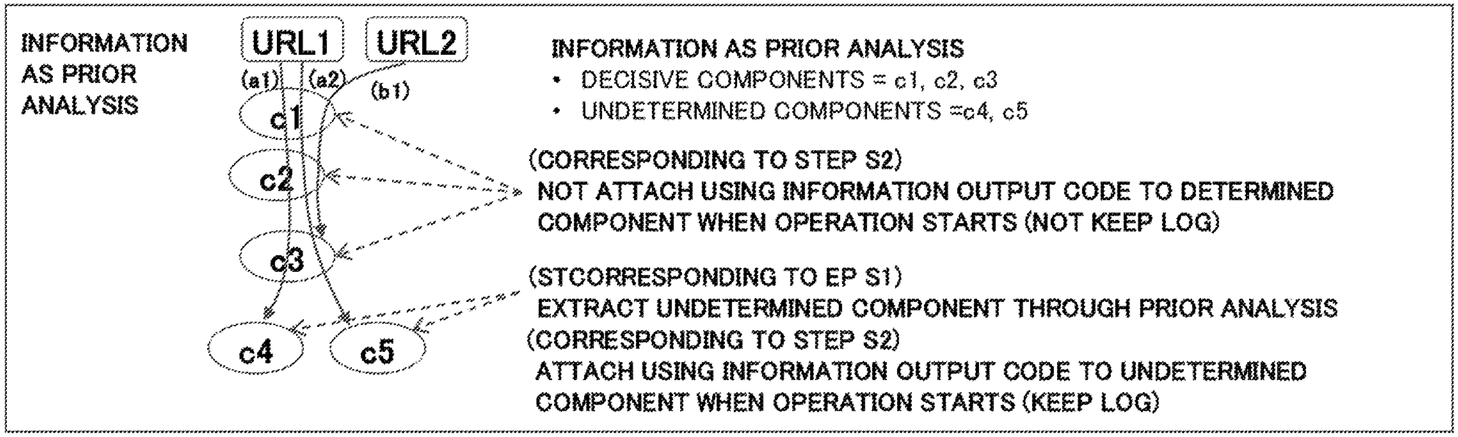
Figure 16B:
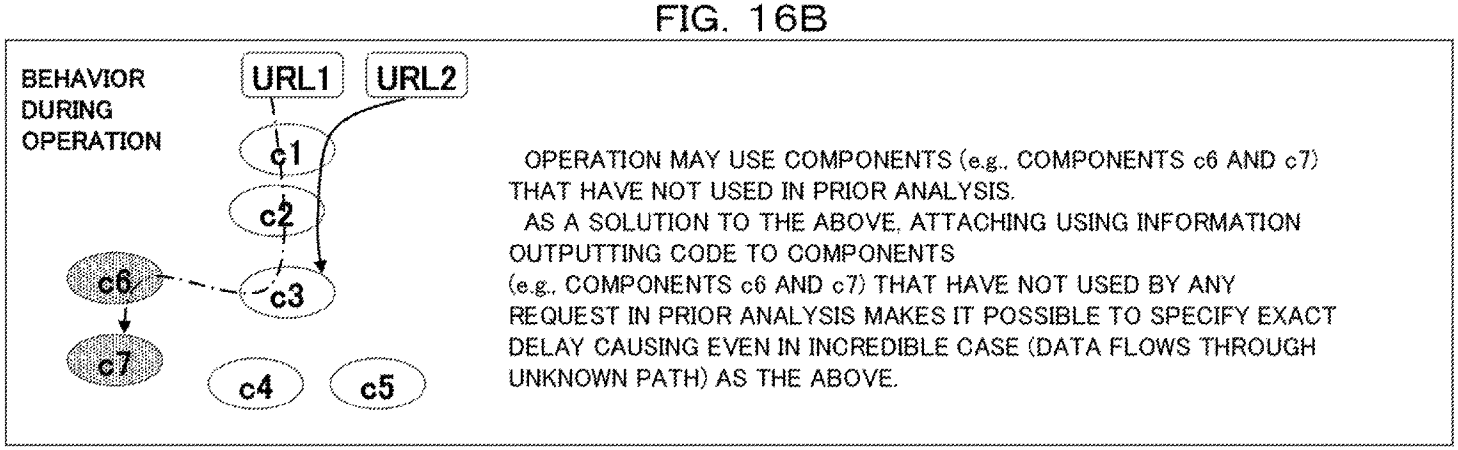
Figure 17A:
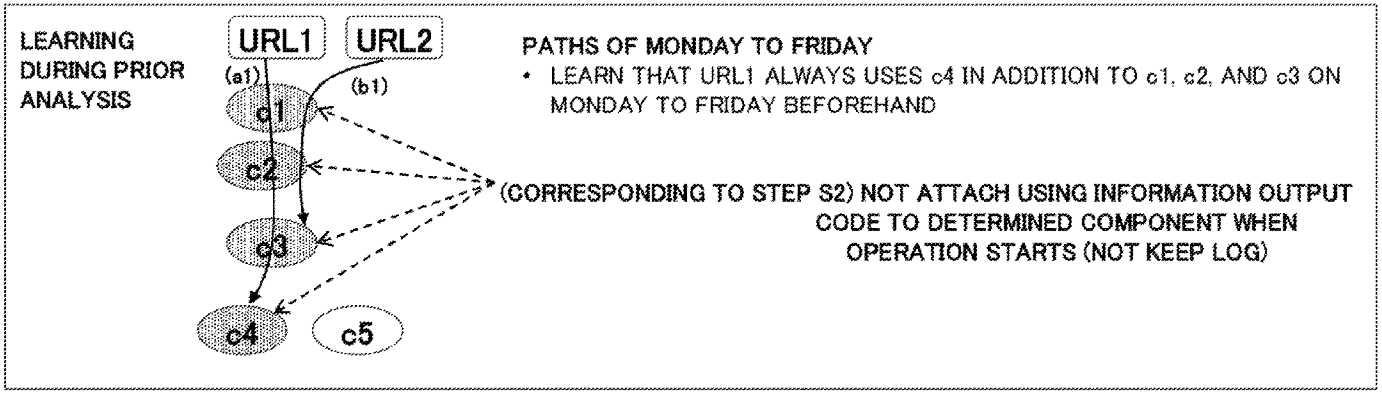
Figure 17B:
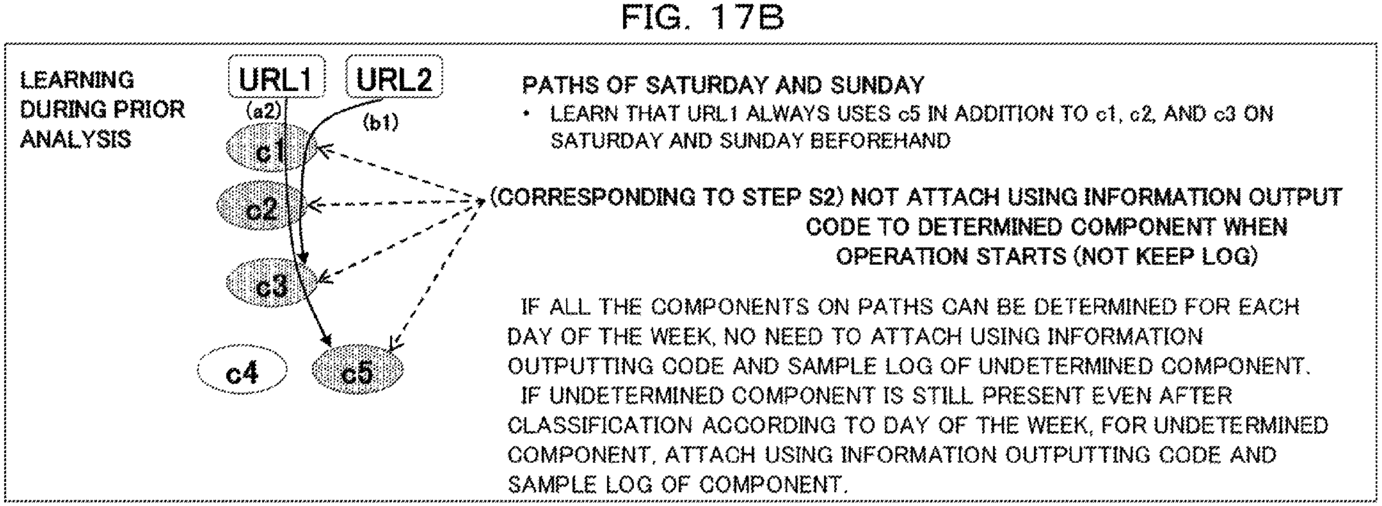

FIG. 5 is a diagram illustrating a first example of path information obtained during the actual operation;

FIG. 6 is a diagram denoting a first example of a process of specifying a delay causing point on the basis of the path information of FIG. 5;

FIG. 7 is a diagram illustrating a second example of path information obtained during the actual operation;

FIG. 8 is a diagram denoting a second example of a process of specifying a delay causing point on the basis of the path information of FIG. 7;

FIGS. 9A-9C are diagrams illustrating a first example of an analyzing procedure of the first embodiment;

FIGS. 10A-10C are diagrams illustrating a second example of an analyzing procedure of the first embodiment;

FIG. 11 is a diagram illustrating an example of a process of determining operation log sampling point information in a method of analysis of the first embodiment;

FIG. 12 is a diagram illustrating an example of a process of specifying a delay causing point of the method of analysis of the first embodiment, using logs sampled during the actual operation;

FIG. 13 is a flow diagram denoting a succession of procedural steps of attaching a using information outputting code (first code) of the first embodiment;

FIG. 14 is a flow diagram illustrating an example of a succession of procedural steps performed by an AP server of the first embodiment;

FIG. 15 is a flow diagram illustrating an example of a succession of procedural steps of specifying a delay causing point of the first embodiment;

FIGS. 16A and 16B are diagrams illustrating a first modification to the first embodiment; and FIGS. 17A and 17B are diagrams illustrating a second modification to the first embodiment.

DESCRIPTION OF THE PREFERRED EMBODIMENTS

Hereinafter, an embodiment of the present invention will now be described with reference to the accompanying drawings. The following embodiments are exemplary, so there is no intention to exclude application of various modifications and techniques not suggested in the following description to the embodiment. Throughout accompanying drawings of the embodiments, like reference numbers designate the same or substantially identical parts and elements.

Figure 1:
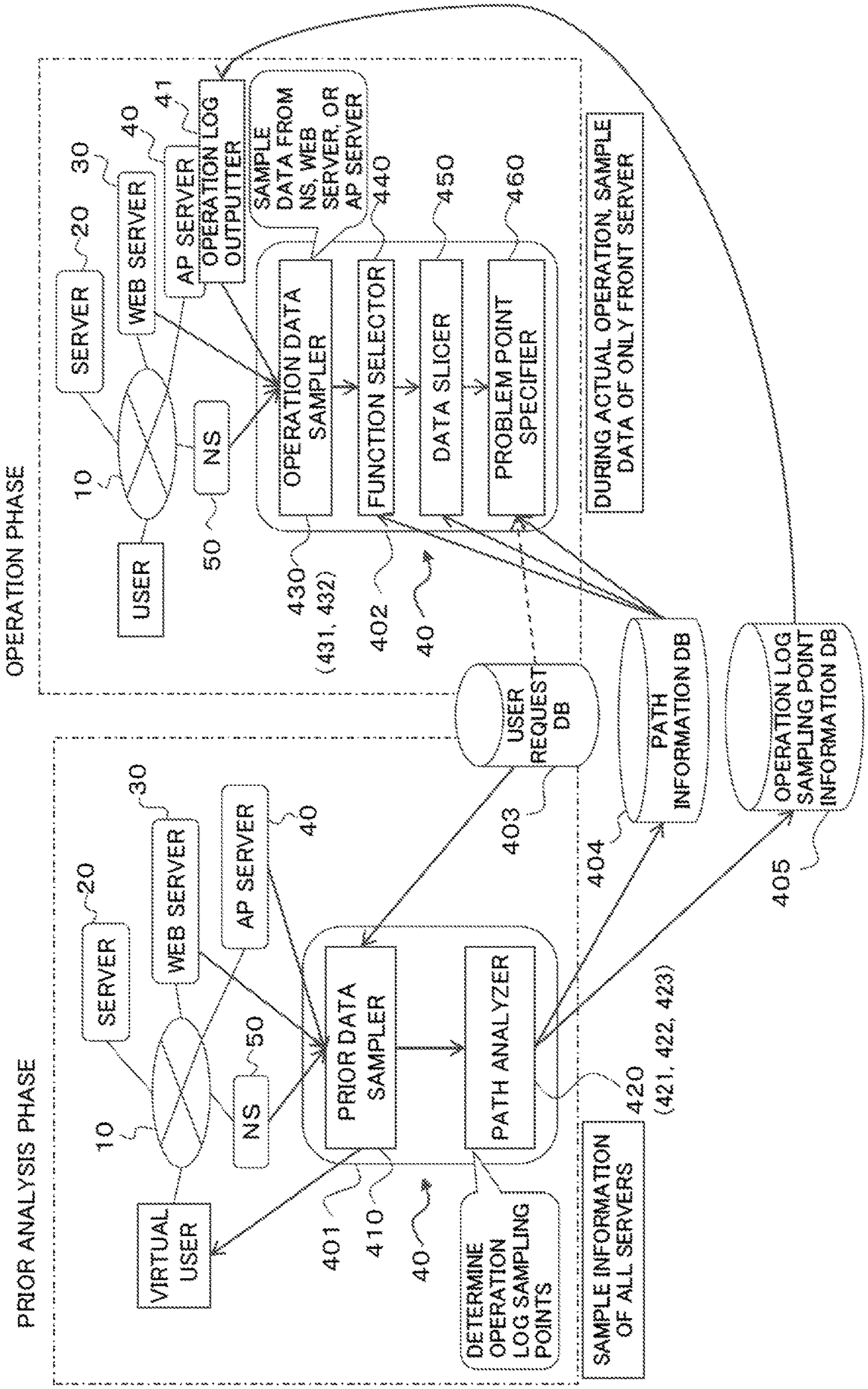
FIG. 1 is a block diagram illustrating an example of a network system to which an analyzer of a first embodiment is applied and an example of the functional configuration of an analyzer of the first embodiment.

(1) Configuration of a Network System to which an Analyzer of the First Embodiment is Applied First of all, description will now be made in relation to the configuration of a network system to which an analyzer of the first embodiment is applied by referring to FIG. 1. FIG. 1 is a block diagram illustrating an example of a network system to which an analyzer of the first embodiment is applied and an example of the functional configuration of the analyzer of the first embodiment.

The network system of FIG. 1 includes, for example, a network 10 such as Internet, a server group (see reference numbers 20, 30, 40) connected to the network 10, and a network switch (NS) 50. The server group includes, for example, a Web server 30, an application (AP) server 40, and another server 20.

The SP server 40 includes, for example, a prior analysis block 401, an operation block 402, a user request database 403, a path information database 404, and an operation log sampling point information database 405 to achieve the function as the analyzer of the first embodiment. Hereinafter, the word "database" is sometimes abbreviated to "DB".

The AP server 40 includes, for example, a processor such as a Central Processing Unit (CPU); a memory such as a Read Only Memory (ROM) and a Random Access Memory (RAM); a recording device such as a Hard Disk Drive (HDD) and a Solid State Drive (SSD); a monitor display such as a Liquid Crystal Display (LCD); and a printer. In the AP server 40, various functions are achieved by the CPU therein reading a predetermined application program from the memory or the recording device and executing the read application program. The predetermined application program includes an analysis program as an example of a program to achieve the function as a prior analysis block 401 and an operation block 402 to be detailed below. The monitor display and a printer are capable of outputting, for example, results of calculation of the CPU. Likewise the AP server 40, the other server 20 and the Web server 30 each include hardware devices of a CPU, a memory, a storing device, a monitor display, and a printer.

The above predetermined application program is provided in the form of being recorded in a computer-readable recording medium such as a flexible disk, a CD (e.g., a CD-ROM, a CD-R, a CD-RW), a DVD (a DVD-ROM, a DVD-RAM, a DVD-R, a DVD-RW, a DVD+R, and a DVD+RW), a Blu-ray disk. In this case, the processor reads the program from the recording medium and forwards the program to an internal or external recording device that stores the program for future use. Another example of the processor is a Micro-Processing Unit (MPU) or a computer in addition to the CPU.

A user request DB 403, a path information DB 404, and an operation log sampling point information DB 405 are achieved by, for example, the memory or the recording device of the AP server 40.

The prior analysis block 401 generates path information and operation log sampling point information in a prior analysis phase as to be detailed below. The prior analysis block 401 can be regarded as an example of an analyzer used in the prior analysis phase and includes, for example, a prior data sampler 410 and a path analyzer 420.

The prior data sampler 410 inputs (sends) data (e.g., requests) of the user request DB 403, as data of a virtual user, to the network 10. Alternatively, the prior data sampler 410 may store actual requests and the actual state at the time of the actual operation to reproduce the operation state of the actual operation. The prior data sampler 410 samples message data that is flowing through the servers 20, 30, and 40 as a result of data input by the virtual user.

The path analyzer 420 analysis a path using data sampled by the prior data sampler 410, and generates and obtains, for example, the path information and operation log sampling point information as a result of the analysis. The obtained path information and the operation log sampling point information are stored in the path information DB 404 and the operation log sampling point information DB 405, respectively. The path analyzer 420 may be regarded as an example of a path information obtainer 421, an example of an undetermined component extractor 422, and an example of a reconstructor 423, which are detailed below.

As to be detailed below, in the operation phase, the operation block 402 specifies the problem point on the basis of operation information (operation data), and the path information and the operation log collecting point information generated by the prior analysis block 401 beforehand.

The operation block 402 can be regarded as an example of an analyzer used in the operation phase, and includes, for example, an operation data sampler 430, a function selector 440, a data slicer 450, and a problem point specifier 460.

The operation data sampler 430 samples, for example, a URL+CGI parameter, as log data (request log), from the data flowing through the server groups 20, 30, and 40 during the actual operation in the operation phase. The operation data sampler 430 can be regarded as an example of an operation information obtainer 431 and an example of a detector 432 that are to be detailed below.

During the actual operation, the operation data sampler 430 may sample the information of only a "front server". The "front server" means the nearest server to the user, which server accepts request from the user, in contrast to "all the servers" in the prior analysis phase. In the example of FIG. 1, the Web server 30 can be the "front server". Alternatively, a non-illustrated load balancer server or the AP server 40 may be the "front server" in some configuration.

A function selector 440 correlates sampled log data with the path information in the path information DB 404 to sort (classify) the functions of the log data.

The data slicer 450 carries out a process of extracting a time domain not containing both normality and abnormality of each sorted function (i.e., process of calculating a change timing of a state).

The problem point specifier 460 detects the presence or the absence of a delay in the time domain extracted by the data slicer 450. If detecting a delay, the problem point specifier 460 narrows or specifies the problem point by referring to the path information in the path information DB 404 as to be detailed below. The problem point specifier 460 can be regarded as an example of a specifier to be detailed below.

The functions of the prior analysis block 401 and the operation block 402 may be achieved by a processor such as a Personal Computer (PC) included in the network system of the first embodiment or may be achieved by, for example, the AP server 40 included in the network system of the first embodiment. The functions of the prior analysis block 401 and the operation block 402 may be achieved by a single processor or a single AP server 40 and the like.

In the first embodiment, the prior analysis block 401 samples and analyzes a detailed log in advance and generates the path information for each function (process) in order to specify the problem point in the operation block 402 without generating undesired overhead and network load. As described above with reference to FIG. 2, the path information includes information (component group) to specify, for example, components used by each function. The path information for each Web function is classified according to URI (URL).

As described above by referring to, for example, FIG. 2, analysis on respective messages flowing through the component c1-c5 classifies the components used in each function Fi (where i is a natural number) according to the function Fi using the URI associated with the function Fi. Hereinafter, the URI associated with each function Fi is represented by URLi.

For example, functions (or "processes") are classified as follows. First of all, on the basis of actual data already captured or data sampled by the prior data sampler 410 reproducing (replaying) test data, the path analyzer 420 analyzes the path of each function Fi of the system.

As described above by referring to FIG. 2, when c1-c5 are regarded as network components, the message data flowing through the components c1-c5 is analyzed and each function Fi is classified using the URL+CGI parameter.

The components c1-c5 may be processed in units of method of the program or in units of block. The word "component" can be replaced by words "module" or "check point". The "path" is regarded as an aggregation of components (i.e., component group). Information representing an association of each function (process) Fi with multiple components c1-c5 is referred to as "path information".

Figure 2:
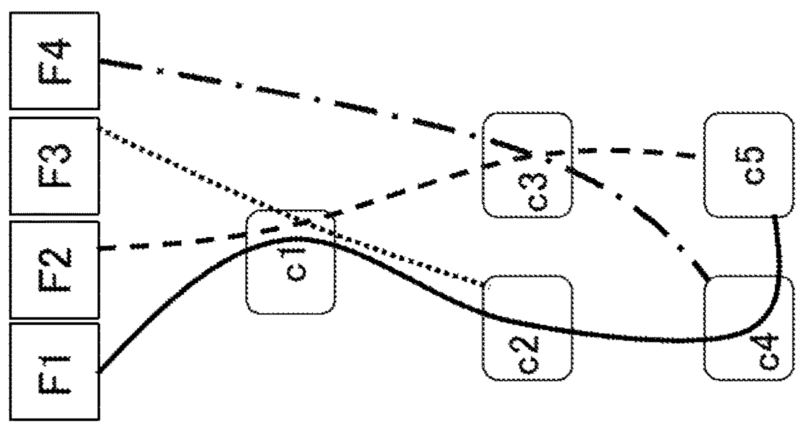
FIG. 2 is a diagram illustrating an example an association (path information) of a function with a component group.

Here, brief description will now be made in relation to a function of the operation block 402 used in the operation phase in order to specify a problem point (abnormal point). In the example of FIG. 2, in cases where functions F1 and F2 delay as compared with a usual case, the operation block 402 can determine whether components c1, c2, c3, c4, and c5 corresponding to the functions F1 and F2 each have a possibility of being a problem point by referring to the path information.

In addition, for example, from the information that functions F3 and F4 do not delay and the path information of the functions F3 and F4, the path analyzer 420 can determine that the components c1, c2, c3, and c4 common to the functions F1, F2, and F3 have no problem. Consequently, the path analyzer 420 (the problem point specifier 460) specifies the remaining component c5 to be the delay causing point.

Assuming that the object to be analyzed is a program, the components c1-c5 can be processed in units of calling the method (function), in units of block, in units of log output point assigned by the user, or in units of any combination of the above.

unit of calling the method (function) calling:
c1=method1( )→c2=method2( )→c4=method3( )
unit of block (block segmented by an if clause or { })
c1=while(..)→c2=if ( ) . . . →c4=else . . . .
unit of log output point assigned by the user
c1={file=foo.java,line=35}→c2={file=foo.java, line=55}→c4={file=boo.java,line=20}

(2) Overview of the Analyzer of the First Embodiment

Here, even if the "URL+CGI parameter" corresponding to the function (request) is the same, pieces of path information corresponding to the same function (request) may be different in components (elements in a component aggregation) contained therein, depending on the operation time zone, the day of the week, a request pattern, and/or the state of the database. In other words, path information corresponding to each function includes different components, so that the operation to be made in response to the request may be undetermined.

In this case, two or more same (equivalent) functions (requests) are integrated into a single function (request), and the path information of the integrated function is defined so as to contain all the components that the same function flows through. An example of integrating two or more same functions into a single function will be detailed below by referring to FIGS. 3 and 4.

Figure 3:
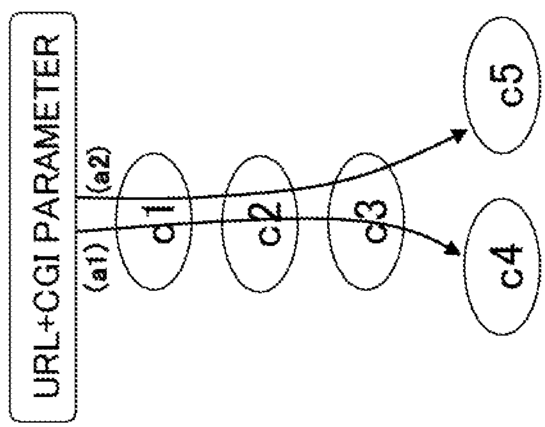
FIG. 3 is a diagram illustrating an example of a case where two pieces of path information having different components are obtained for the same function.
Figure 4:
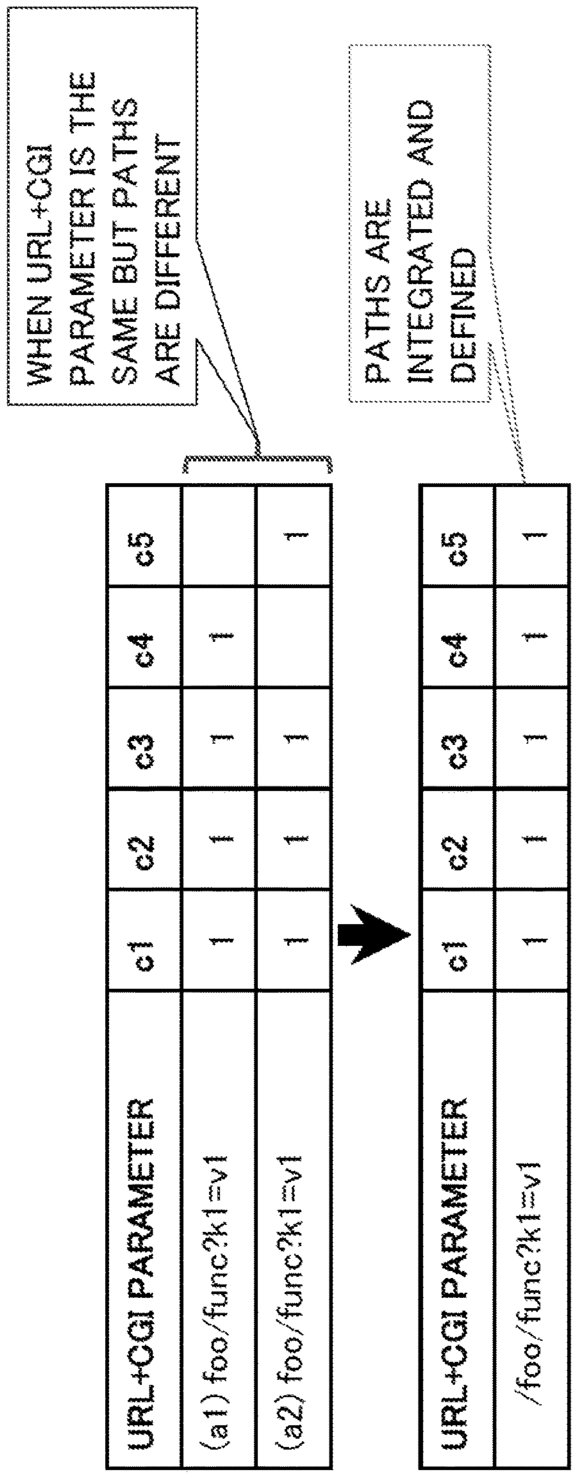
FIG. 4 is a diagram illustrating two pieces of path information for the same function of the example of FIG. 3 and a single piece of path information obtained by integrating the two pieces of path information.

Here, FIG. 3 is a diagram illustrating an example a case where two pieces of path information having different components are obtained for the same function (URL+CGI parameter). FIG. 4 is a diagram illustrating two different pieces of path information for the same function and a single piece of path information obtained by integrating the two pieces of path information.

In the example of FIG. 3, two different paths (a1) and (a2) are obtained for the same "URL+CGI parameter" (/foo/func?k1=v1). As denoted in FIG. 3, the path (a1) includes components c1, c2, c3, and c4; and the path (a2) includes components c1, c2, c3, and c5.

In the top row of FIG. 4, components contained in a path corresponding to each function are denoted in the form of a table. Specifically, a component included in a path corresponding to each function is represented by "1".

As denoted in FIG. 3 and the top row of FIG. 4, the components c1, c2, and c3 are commonly contained in the paths (a1) and (a2). However, the component c4 is contained in only the path (a1) and the component c5 is contained in only the path (a2).

In this case, two piece of path information for the same "URL+CGI parameter" (/foo/func?k1=v1) are integrated into a single piece of path information. Consequently, two paths (a1) and (a2) being denoted in the top row of FIG. 4 and corresponding to the same function are merged and defined into a single piece of path information as denoted in the bottom row of FIG. 4. Accordingly, the integrated path information contains five components c1-c5.

Hereinafter, the same function (URL+CGI parameter) in FIGS. 3 and 4 is sometimes denoted by URL1.

Unfortunately, as described above, if two paths (a1) and (a2) are integrated to be defined as a single piece of path information, the integrated path information includes the components c4 and c5 to be the undetermined (indefinite) part. If the path information contains an undetermined part (e.g., c4 and c5), an analysis is conducted, not grasping the request (function) uses which component between the components c4 and c5. Accordingly, an exact delay causing point is not specified as to be detailed by referring to FIGS. 5-8.

FIG. 5 is a diagram illustrating a first example of path information obtained during the actual operation; and FIG. 6 is a diagram denoting a first example of a process of specifying a delay causing point on the basis of the path information of FIG. 5. FIG. 7 is a diagram illustrating a second example of path information obtained during the actual operation; and FIG. 8 is a diagram denoting a second example of a process of specifying a delay causing point on the basis of the path information of FIG. 7.

First, description will now be made in relation to a first example of a process of specifying a delay causing point if the path information contains an undetermined part with reference to FIGS. 5 and 6. As illustrated in FIGS. 5 and 6, the path information of URL1 is obtained by integrating pieces of path information of two paths (a1) and (a2) and therefore includes five components c1-c5. The path (b1) of URL2 includes three components c1-c3.

Here, as illustrated FIG. 6, the process URL1 is assumed to delay and the process of URL2 is assumed to be normally accomplished. In this case, since the path information of URL1 is integration of two paths (a1) and (a2), the delay causing parts is narrowed into components c4 and c5, but is not further specified to be either component c4 or c5.

For example, when a delaying request flows through the path (a1) of the URL1, the delay causing point is the component c4. In contrast, when a delaying request flows through the path (a2) of the URL1, the delay causing point is the component c5. However, it is impossible to exactly grasp which component c4 and c5 was used and therefore the delay causing point is not further narrowed to either c4 or c5.

Next, description will now be made in relation to a second example of a process of specifying a delay causing point if the path information contains an undetermined part with reference to FIGS. 7 and 8. As illustrated in FIGS. 7 and 8, the path information of URL1 is obtained by integrating pieces of path information of two paths (a1) and (a2) and therefore includes five components c1-c5. The path (b2) of URL2 includes three components c2, c3, and c5.

Here, as illustrated FIG. 8, the process URL3 is assumed to delay and the process of URL1 is assumed to be normally accomplished. In this case, if the normal request flows through the path (a1) of the URL1, the path information of the URL1 includes components c1-c4, but does not include the component c5. Accordingly, considering the path (b2) of the URL3, the delay causing point can be narrowed to the component c5.

This means that if it is grasped that the normal request passes through the path (a1) of the URL1, it is possible to specify that the component c5 is the delay causing point. However, since the delay causing point is analyzed using the path information of the URL1 obtained by integrating two paths (a1) and (a2), locating the delay causing point is missed in finding as illustrated in FIG. 8. In other words, the manner of integrating and defining two or more paths into a single piece of path information makes it impossible to grasp that the request corresponds to either the path (a1) or the path (a2) before the integration, so that the exact delay causing point is not specified.

As a solution to the above, in obtaining path information (operation flow information) through prior analysis in the first embodiment, if a request being the same in function (i.e., URL+CGI parameter) but being different in path (i.e., an aggregation of components) is present (i.e., if a request having the operation is undetermined is present), the undetermined part (undetermined component) is extracted. Then, during the actual operation, information (result of detecting the use of the undetermined component) in relation to the undetermined part, which information is the least information to specify the delay causing point is obtained, so that the exact delay causing point, is specified (estimated) on the basis of the information of the undetermined part. Hereinafter, the "actual operation" is also simply referred to as "operation".

In particular, in the method of analysis of the first embodiment (hereinafter, sometimes referred to as the "present method"), the following configuration makes it possible to exactly specify the problem part (delay causing point).

For example, the present method specifies that a problem component among one or more components that each of the multiple functions uses is the problem point on the basis of the path information for each function, the path information containing information of the one or more component that the function uses and being obtained beforehand, and the operation information obtained during the operation.

Specifically, the present method extracts, as an undetermined component, a component that the same function of the multiple functions sometimes uses but sometimes does not use beforehand. Furthermore, the present invention detects whether the undetermined component is used during the operation. In the event of occurrence of a problem during the operation, the present method specifies the problem causing point on the basis of the path information, the operation information, and result of detecting the use of the undetermined component.

In obtaining the path information through the prior analysis, this configuration extracts, if a request the same in function but different in path is present, an undetermined component. If a problem arises during the operation, the present method obtains the result of detecting the use of the undetermined component being the least information to specify the delay causing point is obtained and can definitively analyzes the part on the basis of the result of detecting the use of the undetermined component, which has been undermined in the traditional method described the above with reference to FIGS. 3-8. Consequently, the exact problem point can be specified.

(3) Functional Configuration of the Analyzer of the First Embodiment

Next, by referring to FIG. 1, description will now be made in relation to the functional configuration of the analyzer of the first embodiment including the prior analysis block 401, the operation block 402, the user request DB 403, the path information DB 404, and the operation log sampling point information DB 405.

The path analyzer 420 in the prior analysis block 401 includes a path information obtainer 421, an undetermined component extractor 422, and a reconstructor 423.

The path information obtainer 421 obtains path information for each function beforehand, which the path information contains information related to one or more components (modules and methods) that each of the multiple functions (URL+CGI parameter) uses.

At that time, the path information obtainer 421 integrates different pieces of path information of the same function into a single piece of path information and defines, as the integrated single piece of path information, information related to an undetermined component to be extracted by the undetermined component extractor 422 (see number "2" in FIGS. 9B and 10B).

The path information obtainer 421 recognizes a component that the same function always uses as a determined component and defines, as the integrated single piece of path information, the information related to the determined component (see number "1" in FIGS. 9B and 10B).

The path information obtainer 421 stores the path information obtained beforehand into the path information DB 404.

Furthermore, the path information obtainer 421 obtains log sampling point information (see FIG. 11) representing points at which logs needs to be sampled during the operation on the basis of the path information obtained as the above and stores the log sampling point information into the operation log sampling point information DB 405.

The undetermined component extractor 422 extracts, as an undetermined component, a component that the same function among the multiple functions sometimes uses but sometimes does not use beforehand.

The operation data sampler 430 of the operation block 402 includes an operation information obtainer 431 and a detector 432.

The operation information obtainer 431 obtains, for example, a URL+CGI parameter, a processing time, and a response time, as the operation information (see operation data (operation log) on the top row of FIG. 12) from data flowing through the server group 20, 30, and 40 during the operation, i.e., the operation phase.

The detector 432 detects which undetermined component is used during the operation, in cooperation with the operation log sampling point information DB 405 and the operation log outputter 41 in the AP server 40.

The detector 432 refers to the operation log sampling point information DB 405 (or the path information DB 404) at the start of the operation, which specifically corresponds to a time period after the path information and the operation log sampling point information are obtained and before the operation starts. The detector 432 recognizes an undetermined component defined by the path information obtained for each function as a target to detect using with reference to the operation log sampling point information DB 405. Furthermore, the detector 432 detects whether the undetermined component recognized as a target to detect using is used during the operation.

More specifically, in the first embodiment, a first code (using information outputting code) that outputs first using detection information (using information) when an undetermined component recognized as a target to detect using is used during the operation is attached to the undetermined component at the start of the operation. The attachment of the using information outputting code uses, for example, a bytecode injection tool. The attachment of the using information outputting code may be achieved by the detector 432 of the operation data sampler 430 or by the path analyzer 420. In cases where a component attached a using information outputting code thereto is used in the AP server 40 being operating, the operation log outputter 41 of the AP server 40 outputs a first using detection information (using information) to the detector 432.

In cases where a problem (delay) arises during the operation, the problem point specifier 460 specifies a problem component among one or more components, as the problem point, on the basis of the path information, the operation information, and the result of detecting the using of the undetermined component (first using detection information) described the above.

The operation log outputter 41, the operation log sampling point information DB 405, and the detector 432 are used in achieving a first modification to the first embodiment to be described below with reference to FIGS. 16A and 16B.

At that time, the detector 432 attaches, at the start of the operation, a second code (using information outputting code) similar to the above first code to an unused component that none of the multiple functions has used when obtaining the path information in advance before the operation starts. Like the first code, the second code also causes, when the unused component is used during the operation, the AP server 40, to output second using detection information (using information).

Using the second code causes the AP server 40 to output, when a component attached thereto a using information outputting code is used during the actual operation, second using detection information (using information) from the operation log outputter 41 in the AP server 40 to the detector 432.

The reconstructor 423 is used to accomplish a first modification to the first embodiment to be detailed below with reference to FIGS. 16A and 16B, and specifically reconstructs, when the second using detection information is output, the path information to contain an unused component. In this description, the function of the reconstructor 423 is assumed to be included in the path analyzer 420, but alternatively may be included in the operation data sampler 430 that receives the second using detection information.

The problem point specifier 460 specifies, when a problem (delay) arises during the operation, a problem component among one or more components on the basis of the path information reconstructed by the reconstructor 423 and the second using detection information.

The undetermined component extractor 422 is also used to achieve a second modification to the first embodiment to be detailed below with reference to FIGS. 17A and 17B.

The undetermined component extractor 422 carries out prior-learning to obtain the relationship between each piece of the path information for each function and one or more components contained in the piece of the path information. The undetermined component extractor 422 may extract a component grasped that a same function sometimes uses but does not sometimes use as an undetermined component.

(4) Operation of the Analyzer of the First Embodiment

Next, the analyzer of the first embodiment will now be described with reference to FIGS. 9-15.

(4-1) First Example of the Analyzing Procedure of the First Embodiment

First of all, description will now be made in relation to a first example of the analyzing procedure of the first embodiment with reference to FIGS. 9A-9C. In particular, the first example describes an analyzing procedure carried out when path information contains an undetermined part as described with reference to FIGS. 5 and 6.

In the prior analysis, the prior data sampler 410 inputs data (e.g., a request and other data) in the user request DB 403, as the data of a virtual user, into the network 10. Consequently, the prior data sampler 410 samples message data that is to flow through the servers 20, 30, and 40 as a result of the inputting of data of the virtual user.

On the basis of the sampled data, the path information obtainer 421 and the undetermined component extractor 422 of the path analyzer 420 perform the following path analysis.

For example, as illustrated in FIG. 9A, the undetermined component extractor 422 extracts undetermined components in advance in step S1. Specifically, a component that the same function among multiple functions sometimes uses but does not sometimes use is extracted as an undetermined component beforehand.

In other words, a component (method) that the same function (URL+CGI parameter, a request) uses at a probability of 100% is extracted as a determined (decisive) component. On the other hand, a component (method) that the same function (URL+CGI parameter) sometimes uses but does not sometimes use is extracted as an undetermined component. Such a determined component may be extracted by the undetermined component extractor 422, the path information obtainer 421, or the cooperation of the undetermined component extractor 422 with the path information obtainer 421.

In the example of FIG. 9A, two different paths (a1)=c1-c2-c3-c4 and (a2)=c1-c2-c3-c5 are obtained for the same URL1. At this time, the components c1-c3, which are used by the both paths for the same URL1, are recognized as determined components; the component c4, which is used by one path (a1) but is not used by the other path (a2), is determined to be an undetermined component; and likewise the component c5, which is used by one path (a2) but is not used by the other path (a1), is determined to be an undetermined component. A single path (b1) is obtained for URL2, and the path (b1) uses three components c1-c3. For the above, with respect to the URL2, the three components c1-c3 are recognized as determined components.

Accordingly, as illustrated in FIG. 9B, the path information obtainer 421 generates path information integrating the path (a1) and the path (a2) and being associated with the single URL1, and path information for URL2 (step S1). In the path information for the URL1 illustrated in FIG. 9B, the value "1" representing a determined component (decisive part) is set in the components c1-c3, and the value "2" representing an undetermined component (indecisive part) is set in the components c4 and c5. In the path information for the URL2 illustrated in FIG. 9B, the value "1" representing a determined component (decisive part) is set in the components c1-c3. The path information obtained beforehand as the above is recorded in the path information DB 404.

In an example to be detailed below with reference to FIGS. 11 and 12, log sampling point information (see FIG. 11) representing one or more points at which a log needs to be sampled during the operation is obtained beforehand on the basis of the path information obtained beforehand as the above and is recorded in the operation log sampling point information DB 405. However, obtaining of log sampling point information is omitted here, and the undetermined components c4 and c5 set to be "2" in the path information as illustrated in FIG. 9B is recognized as points (target to detect using) at which logs is to be sampled during the operation. The same is applied to a second example of the analyzing procedure to be detailed below.

In the example of FIG. 9A, after the path information is obtained beforehand, the detector 432 refers to the path information DB 404 at the start of the operation (specifically, a time period after the path information and the operation log sampling point information are obtained and before the operation starts). In the next step S2, the detector 432 does not attach the using information outputting code to the decisive components c1-c3 (i.e., not keeps the operation log) but attaches the using information outputting code to the undetermined components c4 and c5 (i.e., keeps the operation log).

Consequently, when either one of the undetermined components c4 and c5 attached thereto the using information outputting code is used during the operation, the operation log outputter 41 in the AP server 40 are activated and the first using detection information (using information) is output in the form of the operation log to the detector 432. This makes the detector 432 possible to detect which one of the undetermined components c4 and c5 that are the targets to detect using was used during the operation.

Namely, during the operation, the operation information obtainer 431 obtains the operation log (see, for example, the top row of the FIG. 12) from the data flowing through the server groups 20, 30, and 40. At that time, the detector 432 detects, in cooperation with the operation log outputter 41 of the AP server 40, which undetermined component was used during the operation.

Here, likewise the example of FIG. 6, it is assumed that the process (request) of the URL1 delays and the process (request) of the URL2 is carried out normally.

In this example, when the using information representing that the component c4 was used for the URL1 during the operation is issued from the operation log outputter 41, the component information "1" is attached to the component c4 for the URL1 as denoted in the top row (data when a process of specifying a delay causing point is carried out) of FIG. 9C. Consequently, the problem point specifier 460 can specify the component c4 to be the problem component (the problem point) (step S3).

In contrast, when the using information representing that the component c5 was used for the URL1 during the operation is issued from the operation log outputter 41, the component information "1" is attached to the component c5 for the URL1 as denoted in the bottom row (data when a process of specifying a delay causing point is carried out) of FIG. 9C. Consequently, the problem point specifier 460 can specify the component c5 to be the problem component (the problem point) (step S3).

The above procedure can correctly recognize which one of the components c4 and c5 was used during the operation and narrow the delay causing point into either one of the components c4 and c5. This makes it possible to specify the exact delay causing point.

(4-2) Second Example of the Analyzing Procedure of the First Embodiment

Next, description will now be made in relation to a second example of the analyzing procedure of the first embodiment with reference to FIGS. 10A-10C. In particular, the second example describes an analyzing procedure carried out when the path information contains an undetermined part as described with reference to FIGS. 7 and 8.

Likewise the above first example of the analyzing procedure, in the prior analysis of the second example, the prior data sampler 410 samples message data that is to flow through the servers 20, 30, and 40. After that, on the basis of the sampled data, the path information obtainer 421 and the undetermined component extractor 422 perform the path analysis the same as that performed in the first example.

Likewise the first example of FIG. 9A, the second example of FIG. 10A obtains different paths (a1) and (a2) for the same URL1. At this time, the components c1-c3, which are used by the both paths for the same URL1, are recognized as determined components; the component c4, which is used by one path (a1) but is not used by the other path (a2), is determined to be an undetermined component; and likewise the component c5, which is used by one path (a2) but is not used by the other path (a1), is determined to be an undetermined component. A single path (b2) is obtained for URL3, and the path (b1) uses three components c2, c3, and c5. For the above, with respect to the URL3, the three components c2, c3, and c5 are recognized as determined components.

Accordingly, as illustrated in FIG. 10B, the path information obtainer 421 generates path information by integrating the path (a1) and the path (a2) and being associated with the single URL1, and path information for URL3 (step S1). In the path information for the URL1 illustrated in FIG. 10B, the value “1” representing a determined component (decisive part) is set in the components c1-c3, and the value “2” representing an undetermined component (indecisive part) is set in the components c4 and c5. In the path information for the URL3 illustrated in FIG. 10B, the value “1” representing a determined component (decisive part) is set in the components c2, c3, and c5. The path information obtained beforehand as the above is recorded in the path information DB 404.

Also in the example of FIG. 10A, after the path information is obtained beforehand, the detector 432 refers to the path information DB 404 at the start of the operation. In the next step S2, the detector 432 does not attach the using information outputting code to the decisive components c1-c3 (i.e., not keeps the operation log), but attaches the using information outputting code to the undetermined components c4 and c5 (i.e., keeps the operation log).

Consequently, when either one of the undetermined components c4 and c5 attached thereto the using information outputting code is used during the operation, the operation log outputter 41 in the AP server 40 is activated and the first using detection information (using information) is output in the form of the operation log to the detector 432. Likewise the first example of the analyzing procedure, also in the second example, this makes the detector 432 possible to detect which one of the undetermined components c4 and c5 that are the target to detect using was used during the operation.

Namely, likewise the first example of the analyzing procedure, during the operation, in the second example, the operation information obtainer 431 obtains the operation log (see, for example, the top row of the FIG. 12) from the data flowing through the server groups 20, 30, and 40 during the operation. At that time, the detector 432 detects, in cooperation with the operation log outputter 41 of the AP server 40, which undetermined component was used during the operation.

Here, likewise the example of FIG. 8, it is assumed that the process (request) of the URL1 is carried out normally and the process (request) of the URL3 delays.

In this example, when the using information representing that the component c4 was used for the URL1 during the operation is issued from the operation log outputter 41, the component information “1” is attached to the component c4 of the URL1 as denoted by the data when a process of specifying a delay causing point is carried out in FIG. 10C.

Consequently, the problem point specifier 460 recognizes that the normal request passes through the path (a1) of the URL1 and the path information of the URL1 includes the components c1-c4 but does not include the component c5. Considering the path information (b2) of the URL3, the problem point specifier 460 can narrow the delay causing point to the component c5 (step S3). If URL3 delays under this combinations of components, the normal URL1 never uses c5.

Namely, the problem point specifier 460 can recognizes that the normal request passes through the path (a1) of the URL1 and therefore can specify the component c5 to be the delay causing point. Accordingly, even when the analysis uses the result of integrating the two paths (a1) and (a2), it is possible to avoid miss in finding the delay causing point as denoted in FIG. 8. In other words, the first embodiment can specify the exact delay causing point.

(4-3) Example of a Process of Determining the Operation Log Sampling Point Information of the First Embodiment Next, description will now be made in relation to an example of a process (prior analysis phase) of determining the operation log sampling point information according to the first embodiment with reference to FIG. 11.

In the prior analysis phase, the prior data sampler 410 first inputs the data (e.g., request) in the user request DB 403, as the data of the virtual user, into the network 10. Consequently, the prior data sampler 410 samples the information (information of paths generated for respective requests) of the top row of FIG. 11 as a result of the input of data of the virtual user.

The information of the top row of FIG. 11 includes a URL, processing time (time stamp), and used component information for each request. Specifically, for the first request, information of “URL1”, a processing time “timestamp1”, and used component information “c1:c2:c3:c4” is sampled. Likewise, for the second request, information of “URL2”, a processing time “timestamp2”, and used component information “c1:c2:c3” is sampled; and for the third request, information of “URL1”, a processing time “timestamp3” and used component information “c1:c2:c3:c5” is sampled; for the fourth request, information of “URL3”, a processing time “timestamp4” and used component information “c2:c3:c5” is sampled; for the fifth request, information of "URL4", a processing time "timestamp5" and used component information "c2:c4" is sampled; and for the sixth request, information of "URL4", a processing time "timestamp6" and used component information c2:c3" is sampled.

On the basis of the sampled information as depicted in the top row of FIG. 11, the following path analysis is carried out by the path information obtainer 421 and the undetermined component extractor 422, and consequently, path information as depicted in the middle row of FIG. 11 is obtained and then stored into the path information DB 404.

Namely, in step S11, the paths of each request URL are integrated. A component that requests of the same URL always use is extracted as a determined component and the value "1" is recorded into the path information of the component in question. In contrast, a component that is sometimes used but not sometimes used by requests of the same URL is extracted as an undetermined component and the value "2" is recorded in the path information of the component in question.

For example, as depicted in the path information of the middle row of FIG. 11, different paths (c1:c2:c3:c4 and c1:c2:c3:c5) are obtained for respective two requests (URL1). Here, the components c1-c3 are used by the both paths of URL1 and therefore recognized as determined components. The component c4 is used by one of the paths and not used by the other path, and therefore recognized as an undetermined component. Likewise, the component c5 is used by one of the paths and not used by the other path, and therefore recognized as an undetermined component. Accordingly, the path information of the components c1-c5 used by URL1 is set to be 1, 1, 1, 2, 2.

Likewise, as depicted in the path information of the middle row of FIG. 11, different paths (c2:c4 and c2:c3) are obtained for respective two requests (URL4). Here, the component c2 is used by the both paths of URL4 and therefore recognized as a determined component. The components c4 is used by one of the paths and not used by the other path and therefore recognized as an undetermined component. Likewise, the component c3 is used by one of the paths and not used by the other path and therefore recognized as an undetermined component. Accordingly, the path information of the components c2-c4 used by URL4 is set to be 1, 2, 2.

As depicted in the path information of the middle row of FIG. 11, a single path using the components c1-c3 is obtained for URL2. For the above, the components c1-c3 are recognized as determined components with respect to URL2. Accordingly, the path information of the components c1-c3 used by URL2 is set to be 1, 1, 1.

Likewise, as depicted in the path information of the middle row of FIG. 11, a single path using the components c2, c3, and c5 is obtained for URL3. For the above, the components c2, c3, and c5 are recognized as determined components with respect to URL3. Accordingly, the path information of the components c2, c3, and c5 used by URL3 is set to be 1, 1, 1.

On the basis of the obtained path information denoted in the middle row of FIG. 11, the following analysis is carried out by the path information obtainer 421 and consequently, operation log sampling point information as depicted in the bottom row of FIG. 11 is obtained and then stored into the operation log sampling point information DB 405.

Specifically, in step S12, the path information obtainer 421 refers to the path information and recognizes a component recorded to be undetermined (=2) in one URL (i.e., a component having the value "2" in any point of the corresponding column of the path information) as a target to keep a log. Then the path information obtainer 421 records the value "1" for the component in question in the operation log sampling point information of the operation log sampling point information DB 405.

For example, from the path information denoted as the middle row of FIG. 11, the operation log sampling point information which records the value "1" for the components c3, c4, and c5 in step S12 as denoted in the rower row of FIG. 11 is obtained and is stored in the operation log sampling point information DB 405.

(4-4) Example of a Process of Specifying a Delay Causing Point

Next, description will now me made in relation to an example of a process (operation phase) of specifying a delay causing point using the log obtained during the operation in the analysis of the first embodiment with reference to FIG. 12.

At the start of operation of the operation phase, the operation log sampling point information (see the rower row of FIG. 11) in the operation log sampling point information DB 405 is referred to. Then, a using information outputting code is attached to components (c3, c4, and c5 of FIGS. 11 and 12) for which the value "1" is set in the operation log sampling point information. This makes it possible to keep, when each of those components are used, the operation log of the components in question. After that, the operation information obtainer 431 of the operation data sampler 430 obtains the operation data (operation log) denoted in, for example, the top row of FIG. 12 for each request made during the operation.

The operation log denoted in top row of FIG. 12 includes, for each request, a URL, a processing time, a response time (delay/normal), and information related to an undetermined component used during the request is executed. For example, if a response time exceeds a predetermined threshold, the request corresponding to the response time is recognized to delay. In contrast, if a response time is equal to or less than the threshold, the request corresponding to the response time is recognized to be normal.

Specifically, for the first request, "URL1", a processing time "timestampA", and the response time "restime (delay)" are assumed to be sampled. When the components c1, c2, c3, and c4 are used and executed for URL1 and delay, these components c1, c2, c3, and c4 includes the components c3 and c4 to be targets to sampling the operation log. Accordingly, the detector 432 detects the using information of the components c3 and c4. However, only the component c3 of the components c3 and c4 is recognized to be the undetermined component for URL1 on the basis of the path information and consequently, only the component c4 is recorded as the operation log. Likewise the first request, "URL1", a processing time "timestampD", the response time "restime (delay)", and the component c4 are recorded as the operation log for the fourth request.

For the second request, "URL2", a processing time "timestampB", and the response time "restime (normal)" are assumed to be sampled. When the components c1, c2, and c3 are used and normally executed for URL2, these components c1, c2, and c3 includes the component c3 to be a target to sampling the operation log. Accordingly, the detector 432 detects the using information of the component c3. However, the component c3 is recognized not to be the undetermined component for URL2 on the basis of the path information and consequently, the component c3 is not recorded as the operation log. Likewise the first request, "URL2", a processing time "timestampC", and the response time "restime (normal)" are recorded as the operation log for the third request.

The problem point specifier 460 refers to the path information (see the middle row of FIG. 12) obtained through the prior analysis, and recognizes that, between the URL1 and URL2 to be the target of analysis, URL1 has a possibility of using the undetermined component c3 or c4 (procedure S22).

For the above, the problem point specifier 460 retrieves URL1 from the operation log (see the top row of FIG. 12) obtained in the above manner and recognizes the using information representing that URL1 uses the component c4 (step S23). After that, as denoted in the bottom row (data when a process of specifying the delay causing point) of FIG. 12, the problem point specifier 460 adds the undetermined component c4 into the component used by URL1 and carries out the process of specifying the delay causing point (step S24).

This allows problem point specifier 460 to correctly recognize which one of the components c4 and c5 was used during the operation, so that the delay causing point can be exactly narrowed into one of the components c4 and c5. Accordingly, an exact delay causing point can be specified.

(4-5) Description of Various Processes in the First Embodiment

First of all, description will now be made in relation to an example of a process of attaching a using information outputting code (first code) with reference to a flow diagram (steps S101 and S102) of FIG. 13.

A process of attaching a using information outputting code, which outputs using information when an undetermined component is used, is carried out by the detector 432 or the path analyzer 420 as described the above. The process is carried out along the flow diagram of, for example, FIG. 13.

Specifically, at the start of operation, each operation log sampling point is read from the operation log sampling point information DB 405 (step S101). The read operation log sampling point is embedded in a setting template of a log output mechanism and then output in the form of a setting file. Thereby, a using information outputting code is attached.

Since a versatile tool (e.g., bytecode injection tool) has been prepared, such a tool makes attachment of a using information outputting code possible to automatically accomplish the embedding simply by preparing the setting file of the tool. The embedding is carried out only once after the completion of the prior analysis phase (i.e., before the start of the operation).

Next, description will now be made in relation to an example of a process of the AP server 40 during the operation (i.e., the process of the operation log outputter 41) with reference to the flow diagram (steps S111 and S112) of FIG. 14.

In the operation phase, the AP server 40 correlates the component called when a request is executed with the path information obtained in the prior analysis and stored in the 404 to recognize whether the called component is an undetermined component. If the called component is not an undetermined component, the AP server 40 does not keep the operation log of the called component. In contrast, if the read component is an undetermined component, the AP server 40 keeps the operation log of the called component into the memory of the AP server 40 (step S111).

At the end of the execution of the request, the AP server 40 determines whether the URL (+CGI parameter), a processing time (request time), and a response time (time taken to execute the request processing) of the undetermined component are recorded. If those pieces of information of the undetermined component are not recorded, the AP server 40 outputs no data to the operation data sampler 430. In contrast, if those pieces of information of the undetermined component is recorded, the AP server 40 outputs, as operation data, the information of the undetermined component including the URL, the processing time, and the response time to the operation data sampler 430 (step S112).

Next, description will now be made in relation to an example of a process of specifying a delay causing point of the first embodiment with reference to the flow diagram (steps S121-S125) of FIG. 15.

In the operation phase, when the operation data (operation log) in relation to a new request is obtained from, for example, the AP server 40, the problem point specifier 460 of the operation block 402 reads the operation log (step S121).

The problem point specifier 460 recognizes the determined component (e.g., the components c1-c3 of URL1 of FIG. 12) of the path information and the undetermined component (e.g., the component c4 of URL1 of FIG. 12) of the operation data as the path of the new request (step S122). The problem point specifier 460 determines whether the recognized path is a delayed request (whether the response time of the request exceeds the predetermined threshold) (step S123).

If the recognized path is not a delayed request (NO route of step S123), the problem point specifier 460 returns to the process of step S121 and waits for sampling of the operation data in relation to another new request. In contrast, if the recognized path is a delayed request (YES route in step S123), the problem point specifier 460 carries out the process of specifying the delay causing point using the read request group in the procedure described above with reference to FIGS. 9, 10, and 12 (step S124). After that, the problem point specifier 460 outputs the delay causing point obtained through the process of specifying by means of, for example, a display, a printer, or various recording medium (step S125).

In the description of FIG. 15, the processes performed by the function selector 440 and the data slicer 450 are omitted.

(5) Modification

Next, description will now be made in relation to modifications to the first embodiment with reference to FIGS. 16 and 17.

(5-1) First Modification to the First Embodiment

First of all, description will now be made in relation to a first modification to the first embodiment with reference to FIGS. 16A and 16B.

As depicted in, for example, FIG. 16A, it is assumed that the prior analysis obtains the information representing that the components c1, c2, and c3 are the determined components and the components c4 and c5 are undetermined components (step S1). In this case, likewise the example of FIG. 9A, the using information outputting code is not attached to the determined components c1-c3 while the using information outputting code is attached to the undetermined components c4 and c5 (step S2).

In contrast, a network system sometimes exhibits unexpected behavior that as denoted in FIG. 16B, for example, an unused component that the prior analysis does not use is used. Such unexpected behavior is caused when, for example, the request patterns used in the prior analysis covers insufficient range of request patterns.

As a solution to the above, the first modification to the first embodiment attaches the using information outputting code to an unused component (e.g., components c6 and c7 in FIG. 16B) that any request has not used in the prior analysis. This makes it possible to specify the exact delay causing point even when the network system exhibited the above unexpected behavior (e.g., the request passed through an unknown path as depicted by the one-dotted line in FIG. 16B). However, it is preferred that a using information outputting code is attached to limited unused components selected in consideration of trade-off between the advantage and the overhead of sampling the log, not to all the unused components.

In order to attach a using information outputting code also to an unused component that has not used in obtaining path information beforehand, the detector 432 of the first modification attaches a second code similar to the above first code to the unused code at the start of the operation in the first modification. Likewise the first code, the second code causes, when an unused component is used during the operation, the SP server 40 that uses the unused component to output second using detection information (using information).

Using such a second code causes the operation log outputter 41 of the AP server 40 to output, when a component attached thereto a using information outputting code is used in the AP server 40 being operating, the second using detection information (using information) to the detector 432.

When the second using detection (using information) is output from the operation log outputter 41, the path analyzer 420 or the reconstructor 423 of the operation data sampler 430 reconstructs the path information so as to include the unused component.

With this configuration, when a problem (delay) arise during the operation, the problem point specifier 460 can specify the exact delay causing point (problem components), considering also unused components based on the path information reconstructed by the reconstructor 423, the operation information, and the second using detection information.

(5-2) Second Modification to the First Embodiment

Next, description will now be made in relation to a second modification to the first embodiment with reference to FIGS. 17A and 17B.

In the second modification to the first embodiment, the undetermined component extractor 422 of the path analyzer 420 obtains relationship between the path information for each function and one or more components included in the path information through prior leaning. The undetermined component extractor 422 extracts a component that is sometimes used but sometimes not used by the same function as a result of the prior analysis to be an undetermined component.

As depicted in FIG. 17A, if the prior analysis learns that the paths of URL1 always uses the component c4 in addition to determined components c1, c2, and c3 on Monday to Friday, the second modification operates as follows. Namely, in the operation on Monday to Friday, the component c4 is also regarded as a determined component. Accordingly, as illustrated in FIG. 17A, only the path (a1) is used for the path for Monday to Friday, and the path (a2) (component c5) is not used. Consequently, using information outputting code is not attached to the determined components c1-c4.

As depicted in FIG. 17B, if the prior analysis learns that the paths of URL1 always uses the component c5 in addition to determined components c1, c2, and c3 on Saturday and Sunday, the second modification operates likewise the above operation of Monday to Friday. Namely, in the operation on Saturday and Sunday, the component c5 is also regarded as a determined component. Accordingly, as illustrated in FIG. 17B, only the path (a2) is used for the path for Saturday and Sunday, and the path (a1) (component c4) is not used. Consequently, using information outputting code is not attached to the determined components c1-c3, and c5.

As a result of the above learning during the prior analysis, if an undetermined component is still present, the using information outputting code is attached to the undetermined component.

Here, if all the components on a path can be determined according to each day of the week, there is no need to attach a using information outputting code to keep the log of an undetermined component. This is because it is possible to specify which one of the component c4 or c5 the path for URL1 passes through if the day of the week of the operation is grasped. Accordingly, in cases where an undetermined component is still present even after the classification (learning) according to the day of the week, a using information outputting code is attached to the undetermined component to keep the log of the undetermined component.

The above second modification carries out prior learning according to the day of the week. Alternatively, the prior learning may concern the time zone of a component, the request pattern, or the state of the database.

(6) Others

The preferred embodiment of the present invention is described as the above. However, the present invention should by no means limited to the foregoing embodiment and various changes and modifications can be suggested without departing from the spirit of the present invention.

For example, the AP server 40 that outputs the operation log and a server including the prior analysis block 401 and the operation block 402 that achieve the function as the analyzer of the first embodiment may be separately disposed on two different hardware device, but may be disposed on the same hardware device.

According to the first embodiment, a problem point can be exactly specified.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An analyzer comprising:

a memory storing a database; and a processor coupled to the memory and the processor configured to:

record operation flow including one or more methods that each of a plurality of functions uses and being obtained for each of the plurality of functions in the database before an operation;

extract a first method that a same function among the plurality of functions sometimes uses and sometimes does not use before the operation by referring to the operation flow recorded in the database stored in the memory;

detect whether the first method is used during the operation;

specify, when a problem arises during the operation, a problem component, as a problem point, from among the one or more methods based on the operation flow obtained before the operation, operation log obtained during the operation, and a result of detecting the use of the first method;

specify exact delay causing point by specifying the problem component;

attach, at a start of the operation, a second code to an unused component that the plurality of functions do not use to obtain the operation flow before the operation, the second code outputting second information when the unused component is used during the operation; and reconstruct, when the second information is output, the operation flow to include the unused component.

2. The analyzer according to claim 1, wherein the processor is further configured to:

integrate different pieces of the operation flow of the same function into a single piece of the operation flow; and define the first method in the integrated single piece of the operation flow.

3. The analyzer according to claim 2, wherein the processor is further configured to:

recognize a second method that the same function always uses; and define second method in the integrated single piece of the operation flow.

4. The analyzer according to claim 2, wherein the processor is further configured to:

recognize, when the operation starts, the first method defined in the operation flow obtained for each of the plurality of functions as a target to detect using; and detect, during the operation, whether the first method recognized as the target to detect using is used.

5. The analyzer according to claim 4, wherein the processor is further configured to:

attach, at the start of the operation, a first code to the first method recognized as the target to detect using, the first code outputting first information when the first method is used during the operation; and use the first information as the result of detecting using.

6. The analyzer according to claim 1, wherein the processor is further configured to:

obtain relationship between the operation flow for each of the plurality of functions and the one or more methods contained in the operation flow through prior learning; and extract, as the first method, a method determined to be sometimes used and not sometimes used by the same function as a result of the prior learning.

7. A method comprising:

in a processor, recording operation flow including one or more methods that each of a plurality of functions uses and being obtained for each of the plurality of functions in a database before an operation;

extracting a first method that a same function among the plurality of functions sometimes uses and sometimes does not use before the operation by referring to the operation flow recorded in the database stored in a memory;

detecting whether the first method is used during the operation;

specifying, when a problem arises during the operation, a problem component, as a problem point, from among the one or more methods based on the operation flow obtained before the operation, operation log obtained during the operation, and a result of detecting the use of the first method;

specifying exact delay causing point by specifying the problem component;

attaching, at a start of the operation, a second code to an unused component that the plurality of functions do not use to obtain the operation flow before the operation, the second code outputting second information when the unused component is used during the operation; and reconstructing, when the second information is output, the operation flow to include the unused component.

8. The method according to claim 7, further comprising:

integrating different pieces of the operation flow of the same function into a single piece of the operation flow; and defining the first method in the integrated single piece of the operation flow.

9. The method according to claim 8, further comprising:

recognizing a second method that the same function always uses; and defining second method in the integrated single piece of path the operation flow.

10. The method according to claim 8, further comprising:

recognizing, when the operation starts, the first method defined in the operation flow obtained for each of the plurality of functions as a target to detect using; and detecting, during the operation, whether the first method recognized as the target to detect using is used.

11. The method according to claim 10, further comprising:

attaching, at the start of the operation, a first code to the first method recognized as the target to detect using, the first code outputting first information when the first method is used during the operation; and using the first information as the result of detecting using.

12. The method according to claim 7, further comprising:

obtaining relationship between the operation flow for each of the plurality of functions and the one or more methods contained in the operation flow through prior learning; and extracting, as the first method, a method determined to be sometimes used and not sometimes used by the same function as a result of the prior learning.

13. A non-transitory computer-readable recording medium having stored therein an analysis program for causing a computer to execute a process comprising:

recording operation flow including one or more methods that each of a plurality of functions uses and being obtained for each of the plurality of functions in a database before an operation;

extracting a first method that a same function among the plurality of functions sometimes uses and sometimes does not use before the operation by referring to the operation flow recorded in the database stored in a memory;

detecting whether the first method is used during the operation;

specifying, when a problem arises during the operation, a problem component, as a problem point, from among the one or more methods based on the operation flow obtained before the operation, operation log obtained during the operation, and a result of detecting the use of the first method;

specifying exact delay causing point by specifying the problem component;

attaching, at a start of the operation, a second code to an unused component that the plurality of functions do not use to obtain the operation flow before the operation, the second code outputting second information when the unused component is used during the operation; and reconstructing, when the second information is output, the operation flow to include the unused component.

14. The non-transitory computer-readable recording medium according to claim 13, wherein the process further comprises:

integrating different pieces of the operation flow of the same function into a single piece of the operation flow; and defining the first method in the integrated single piece of the operation flow.

15. The non-transitory computer-readable recording medium according to claim 14, wherein the process further comprises:

recognizing a second method that the same function always uses; and defining second method in the integrated single piece of the operation flow.

16. The non-transitory computer-readable recording medium according to claim 14, wherein the process further comprises:

recognizing, when the operation starts, the first method defined in the operation flow obtained for each of the plurality of functions as a target to detect using; and detecting, during the operation, whether the first method recognized as the target to detect using is used.

17. The non-transitory computer-readable recording medium according to claim 16, wherein the process further comprises:

attaching, at the start of the operation, a first code to the first method recognized as the target to detect using, the first code outputting first information when the first method is used during the operation; and using the first information as the result of detecting using.

* * * * *